United States Patent
Wang et al.

(10) Patent No.: US 10,316,784 B2
(45) Date of Patent: Jun. 11, 2019

(54) AIR CHARGING CONTROL OF ENGINE ASSEMBLY WITH MULTIPLE TURBINES

(71) Applicant: GM GLOBAL TECHNOLOGY OPERATIONS LLC, Detroit, MI (US)

(72) Inventors: Yue-Yun Wang, Troy, MI (US); Ibrahim Haskara, Macomb, MI (US); Giuseppe Conte, Turin (IT); Carmen Pedicini, Turin (IT)

(73) Assignee: GM Global Technology Operations LLC., Detroit, MI (US)

( * ) Notice: Subject to any disclaimer, the term of this patent is extended or adjusted under 35 U.S.C. 154(b) by 133 days.

(21) Appl. No.: 15/615,379

(22) Filed: Jun. 6, 2017

(65) Prior Publication Data

US 2018/0347499 A1 Dec. 6, 2018

(51) Int. Cl.
| | |
|---|---|
| F02D 41/26 | (2006.01) |
| F02B 37/013 | (2006.01) |
| F02D 41/00 | (2006.01) |
| F02D 41/14 | (2006.01) |

(52) U.S. Cl.
CPC .......... F02D 41/263 (2013.01); F02B 37/013 (2013.01); F02D 41/0002 (2013.01); F02D 41/0007 (2013.01); F02D 41/1401 (2013.01); F02D 41/1402 (2013.01); F02D 2041/1434 (2013.01); F02D 2200/0402 (2013.01)

(58) Field of Classification Search
CPC .. F02D 41/263; F02D 41/007; F02D 41/1402; F02D 2041/1434; F02D 2200/0402; F02B 37/013

USPC .................. 60/602, 612; 123/562
See application file for complete search history.

(56) References Cited

U.S. PATENT DOCUMENTS

| | | | |
|---|---|---|---|
| 6,698,203 B2 | 3/2004 | Wang | |
| 9,291,093 B2 | 3/2016 | Wang et al. | |
| 2008/0221710 A1* | 9/2008 | Brunell | G05B 5/01 700/45 |
| 2012/0173118 A1 | 7/2012 | Wang et al. | |
| 2012/0222417 A1* | 9/2012 | Fontvieille | F02D 41/0007 60/602 |
| 2014/0174413 A1* | 6/2014 | Huang | F02D 41/1401 123/568.18 |
| 2014/0174414 A1* | 6/2014 | Huang | F02D 41/1401 123/568.21 |
| 2015/0068203 A1* | 3/2015 | Wang | F02B 37/013 60/612 |

(Continued)

Primary Examiner — Thai Ba Trieu
(74) Attorney, Agent, or Firm — Quinn IP Law (57) ABSTRACT

An engine assembly includes an engine and a plurality of actuators. The plurality of actuators includes a first turbine serially connected to a second turbine, the first turbine being a relatively high pressure turbine and the second turbine being a relatively low pressure turbine. A controller is configured to transmit respective command signals to the plurality of actuators. The controller is programmed to obtain respective transfer rates for the plurality of actuators based at least partially on an inversion model. The controller is programmed to control an output of the engine by commanding the plurality of actuators to respective operating parameters via the respective command signals. Prior to obtaining the respective transfer rates, the controller is programmed to determine a respective plurality of desired values and respective correction factors for the plurality of actuators.

14 Claims, 4 Drawing Sheets

(56) References Cited

U.S. PATENT DOCUMENTS

2016/0076473 A1* 3/2016 Huang ................ F02D 41/1401
　　　　　　　　　　　　　　　　　　　　　　701/108
2016/0146130 A1　　5/2016 Haskara et al.
2018/0051639 A1* 2/2018 Wang .................. F02D 41/0007

* cited by examiner

AIR CHARGING CONTROL OF ENGINE ASSEMBLY WITH MULTIPLE TURBINES

INTRODUCTION

The disclosure relates generally to control of an engine assembly, and more particularly, to control of air charging in an engine assembly having multiple turbines. A turbine utilizes pressure in an exhaust system of the engine to drive a compressor to provide boost air to the engine. The boost air increases the flow of air to the engine, compared to a naturally aspirated intake system, and therefore increases the output of the engine.

SUMMARY

An engine assembly includes an engine and a plurality of actuators operatively connected to the engine. The plurality of actuators includes a first turbine serially connected to a second turbine, the first turbine being a relatively high pressure turbine and the second turbine being a relatively low pressure turbine. A controller is configured to transmit respective command signals to the plurality of actuators. The controller has a processor and a tangible, non-transitory memory on which is recorded instructions for executing a method for controlling air charging in the assembly. At least one sensor is configured to transmit a sensor feedback to the controller.

Execution of the instructions by the processor causes the controller to obtain respective transfer rates for the plurality of actuators based at least partially on an inversion model. The controller is programmed to obtain respective operating parameters for the plurality of actuators based at least partially on the respective transfer rates. The controller is programmed to control an output of the engine by commanding the plurality of actuators to the respective operating parameters via the respective command signals.

Prior to obtaining the respective transfer rates, the controller may be programmed to determine a respective plurality of desired values for the plurality of actuators. Respective correction factors for the plurality of actuators are obtained based at least partially on the respective plurality of desired values and the sensor feedback.

An air inlet conduit is configured to direct air into the engine. An exhaust gas conduit is configured to receive an exhaust gas from the engine. The plurality of actuators further includes: a high pressure turbine bypass valve operatively connected to the first turbine, an intake throttle valve fluidly connected to the air inlet conduct and an exhaust throttle valve fluidly connected to the exhaust gas conduit.

The plurality of actuators further includes: a high pressure exhaust gas recirculation valve located in a first conduit between the air inlet conduit and the exhaust gas conduit, and a low pressure exhaust gas recirculation valve located in a second conduit between the air inlet conduit and the exhaust gas conduit. A first compressor and a second compressor are configured to be driven by the first and second turbines, respectively. The first turbine, the second turbine, the first compressor and the second compressor form a two-stage turbocharger system.

The respective plurality of desired values may include: a desired low pressure compressor pressure ratio ($\bar{\beta}_{c,LP}$), a desired high pressure compressor pressure ratio ($\bar{\beta}_{c,HP}$), a desired exhaust pressure ($\bar{p}_x$), a desired intake pressure ($\bar{p}_i$), at least one of a desired high pressure exhaust gas recirculation rate ($\bar{r}_{egr,HP}$) and a desired burned gas fraction in an intake manifold ($\bar{F}_i$); and at least one of a desired low pressure exhaust gas recirculation rate ($\bar{r}_{egr,LP}$) and a desired burned gas fraction in a low pressure compressor inlet ($\bar{F}_c$). The respective operating parameters may include: a low pressure turbine position ($u_{vgt,LP}$), a high pressure turbine position ($u_{vgt,HP}$), a high pressure bypass valve position ($u_{bp,HP}$), an intake throttle valve position ($u_{itv}$), a high pressure exhaust gas recirculation valve position ($u_{egr,HP}$), and a low pressure exhaust gas recirculation valve position ($u_{egr,LP}$).

The respective transfer rates may include: a low pressure turbine transfer rate ($R_{t,LP}$), a high pressure turbine transfer rate ($R_{t,HP}$), a high pressure bypass flow ($W_{bp,HP}$), an intake throttle valve flow ($W_{itv}$), a high pressure exhaust gas recirculation flow ($W_{egr,HP}$), and a low pressure exhaust gas recirculation flow ($W_{egr,LP}$). The low pressure turbine transfer rate ($R_{t,LP}$) may be obtained as a function of a low pressure turbine enthalpy ($h_{t,LP}$), a low pressure compressive power ($P_{c,LP}$), and one of the respective correction factors ($v_1$) such that:

$$R_{t,LP} = \frac{P_{c,LP}}{h_{t,LP}} + v_1.$$

The high pressure turbine transfer rate ($R_{t,HP}$) may be obtained as a function of a high pressure compressive power ($P_{c,HP}$), a desired exhaust flow into the high pressure turbine ($\overline{W}_{t,HP,des}$), an exhaust temperature ($T_x$), a predefined capacity ($c_p$) and one of the respective correction factors ($v_2$) such that:

$$R_{t,HP} = \frac{P_{c,HP}}{c_p \overline{W}_{t,HP,des} T_x} + v_2.$$

The high pressure bypass flow ($W_{bp,HP}$) may be based at last partially on a total charge flow into the engine ($W_{cyl}$), a total fuel flow injected ($W_f$), a high pressure exhaust gas recirculation flow ($W_{egr,HP}$), a desired exhaust flow into the high pressure turbine ($\overline{W}_{t,HP,des}$) and one of the respective correction factors ($v_3$) such that:

$$W_{bp,HP} = (W_{cyl} + W_f - W_{egr,HP}) - \overline{W}_{t,HP,des} + v_3.$$

The intake throttle valve flow ($W_{itv}$), the high pressure EGR flow ($W_{egr,HP}$) and the low pressure EGR flow ($W_{egr,LP}$) may be at least based partially on the total charge flow into the engine ($W_{cyl}$), a compressor inlet burnt gas fraction ($F_c$), an intake manifold burnt gas fraction ($F_i$), an exhaust manifold burnt gas fraction ($F_x$), a time ($t$), a time delay ($\tau$), and the respective correction factors ($v_4, v_5, v_6$) such that:

$$\begin{bmatrix} W_{itv} \\ W_{egr,HP} \\ W_{egr,LP} \end{bmatrix} = \begin{bmatrix} 1 & 1 & 0 \\ F_c - F_i & F_x - F_i & 0 \\ -F_c & 0 & F_x(t-\tau) \end{bmatrix}^{-1} \begin{bmatrix} W_{cyl} \\ 0 \\ 0 \end{bmatrix} + \begin{bmatrix} v_4 \\ v_5 \\ v_6 \end{bmatrix}.$$

The controller may be configured to determine a power split ratio (PSR) based on a desired boost pressure ($\bar{\beta}_c$), a desired low pressure compressor ratio ($\bar{\beta}_{c,LP}$) (and a corrected flow through the first compressor ($Q_{c1}$)) such that:

$$PSR = \frac{\bar{\beta}_{c,LP} - 1}{\bar{\beta}_c - 1}$$

The above features and advantages and other features and advantages of the present disclosure are readily apparent from the following detailed description of the best modes for carrying out the disclosure when taken in connection with the accompanying drawings.

DETAILED DESCRIPTION

Figure 1:
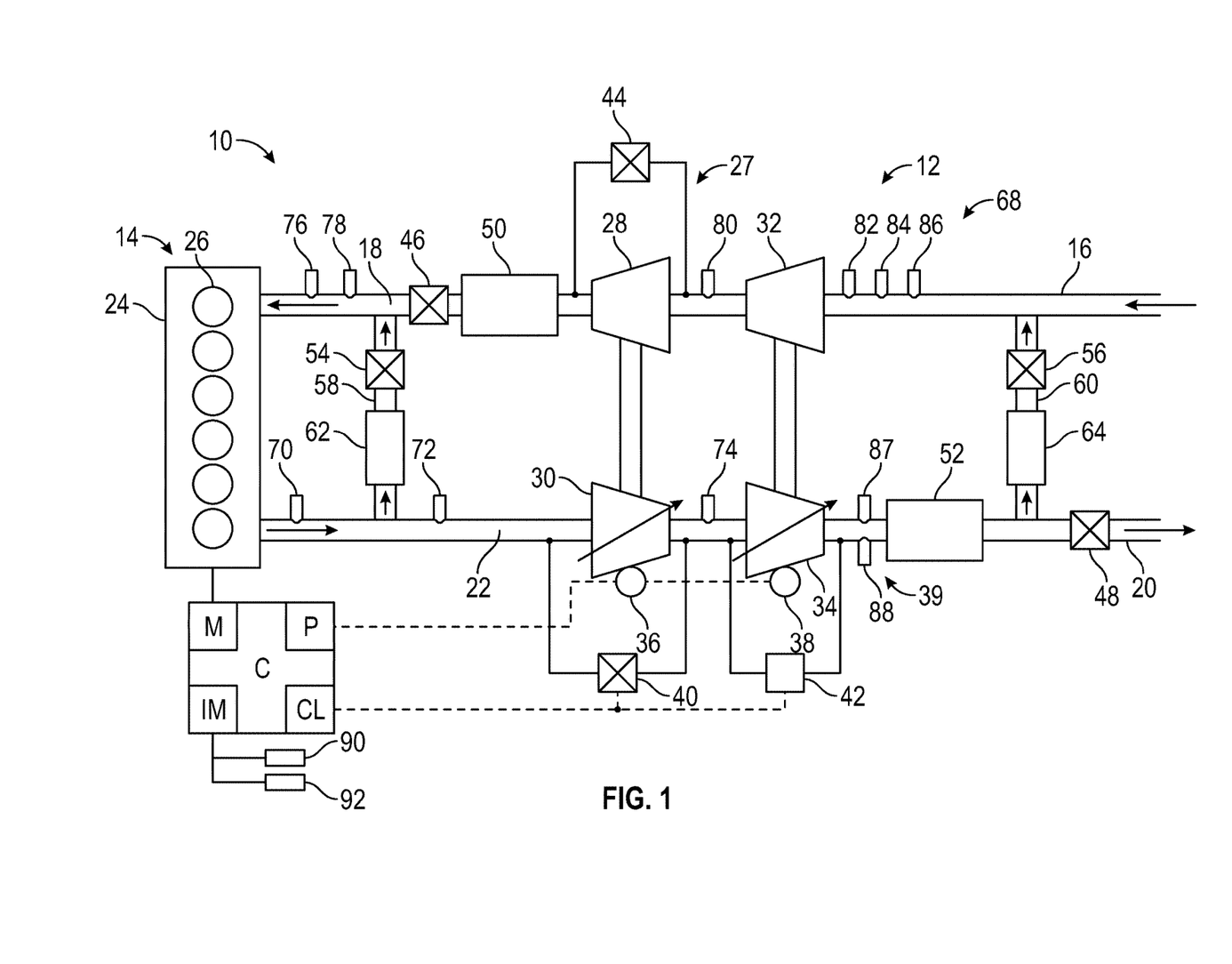
FIG. 1 is a schematic fragmentary view of an engine assembly having a controller.

Referring to the drawings, wherein like reference numbers refer to like components, FIG. 1 schematically illustrates a device 10 having an engine assembly 12. The device 10 may be a mobile platform, such as, but not limited to, standard passenger car, sport utility vehicle, light truck, heavy duty vehicle, ATV, minivan, bus, transit vehicle, bicycle, robot, farm implement, sports-related equipment, boat, plane, train or other transportation device. The device 10 may take many different forms and include multiple and/or alternate components and facilities.

The assembly 12 includes an internal combustion engine 14, referred to herein as engine 14, for combusting an air-fuel mixture in order to generate output torque. The assembly 12 includes an air inlet conduit 16, which may be configured to receive fresh air from the atmosphere. The engine 14 may combust an air-fuel mixture, producing exhaust gases. An intake manifold 18 is fluidly coupled to the engine 14 and capable of directing air into the engine 14, via the air inlet conduit 16. The assembly 12 includes an exhaust manifold 22 in fluid communication with the engine 14, and capable of receiving and expelling exhaust gases from the engine 14, and discharging the exhaust gas via an exhaust gas conduit 20 to the atmosphere. Referring to FIG. 1, the engine 14 includes an engine block 24 having at least one cylinder 26. The engine 14 may be either a spark-ignition engine or a compression-ignition engine, and may be piston-driven.

Referring to FIG. 1, the assembly includes a first compressor 28 configured to be driven by a first turbine 30 and a second compressor 32 configured to be driven by a second turbine 34. The first turbine 30, the second turbine 34, the first compressor 28 and the second compressor 32 form a two-stage turbocharger system 27. The first compressor 28 is employed to compress the inlet air to increase its density to provide a higher concentration of oxygen in the air fed to the engine 14. Here, the inlet air for the first compressor 28 is caused to be at a relatively higher pressure than the inlet air for the second compressor 32, thus, the first compressor 28 may be referred to as a high pressure (HP) compressor, and the second compressor 32 as a low pressure (LP) compressor. Likewise, the inlet air for the second turbine 34 is at a lower pressure than the inlet air for the first turbine 30, thus the second turbine 34 may be referred to as a low pressure turbine 34, and the first turbine 30 may be termed a high pressure turbine 30.

Referring to FIG. 1, the assembly 12 includes a controller C operatively connected to or in electronic communication with the engine 14. Referring to FIG. 1, the controller C includes at least one processor P and at least one memory M (or any non-transitory, tangible computer readable storage medium) on which are recorded instructions for executing method 100, shown in FIG. 2 and described below, for air charging control in the assembly 12. The memory M can store controller-executable instruction sets, and the processor P can execute the controller-executable instruction sets stored in the memory M. Referring to FIG. 1, the first and second turbines 30, 34 may be variable geometry turbines (VGT) each having respective first and second VGT geometry sensors 36, 38, for providing real-time information concerning the geometry of the first and second turbines to the controller C.

Referring to FIG. 1, the assembly 12 includes a plurality of actuators 39 configured to at least partially control operation of the assembly 12, via control of air charging. The plurality of actuators 39 includes the first turbine 30, the second turbine 34 and as described below, a number of valves that are each selectively controllable by the controller C. Referring to FIG. 1, the plurality of actuators 39 includes: a high pressure turbine bypass valve 40 operatively connected to the first turbine 30, an intake throttle valve 46 fluidly connected to the air inlet conduit 18 and an exhaust throttle valve 48 fluidly connected to the exhaust gas conduit 20. The high pressure turbine bypass valve 40 is configured to control the incoming flow to the first turbine 30. The exhaust throttle valve 48 may be generally open and may be closed to raise the exhaust pressure ($p_x$).

Referring to FIG. 1, the assembly 12 may include a wastegate 42 that is operatively connected to the second turbine 34 and configured to open when boost pressure is above a threshold. A compressor bypass valve 44 is configured to allow bypass of the first compressor 28. A compressed air cooler 50 may be positioned on the high-pressure side of the first compressor and configured to dissipate some of the heat resulting from compression of the inlet air. An after treatment system 52 may be positioned between the exhaust manifold 22 and a point on the exhaust gas conduit 20 at which exhaust gases are released to the atmosphere. The after treatment system 52 may include oxidation and reduction catalysts and a particulate filter.

The assembly 12 may include an exhaust gas recirculation (EGR) system with multiple routes of recirculating exhaust gas. Referring to FIG. 1, the plurality of actuators 39 further includes a high pressure exhaust gas recirculation valve 54 and a low pressure exhaust gas recirculation valve 56 located in respective first and second conduits 58, 60 provided between the air inlet conduit 18 and the exhaust gas conduit 22. A first cooling unit 62 and a second cooling unit 64 may be operatively connected to the high pressure EGR valve and the low pressure EGR valve, respectively. The first and second cooling units 62, 64 are employed to reduce the temperature of the re-circulated exhaust gases prior to mixing with air being admitted through the intake manifold 16.

Referring to FIG. 1, the controller C is configured to receive sensor feedback from one or more sensors 68. In the embodiment shown, the sensors 68 include an exhaust temperature sensor 70, an exhaust pressure sensor 72, between-turbines pressure and temperature sensor 74, intake manifold pressure sensor 76, intake manifold temperature sensor 78, high pressure compressor inlet pressure sensor 80, low pressure compressor inlet pressure and temperature sensors 82, 84, a mass airflow rate sensor 86, post-turbine pressure sensor 87 and post-turbine temperature sensor 88. Additionally, various parameters may be obtained via "virtual sensing", such as for example, modeling based on other measurements. For example, the intake temperature may be virtually sensed based on a measurement of ambient temperature and other engine measurements.

Referring to FIG. 1, the controller C is programmed to receive a torque request from an operator input or an auto start condition or other source monitored by the controller C. The controller C is configured to receive input signals from an operator, such as through an accelerator pedal 90 and brake pedal 92, to determine the torque request.

Figure 2:
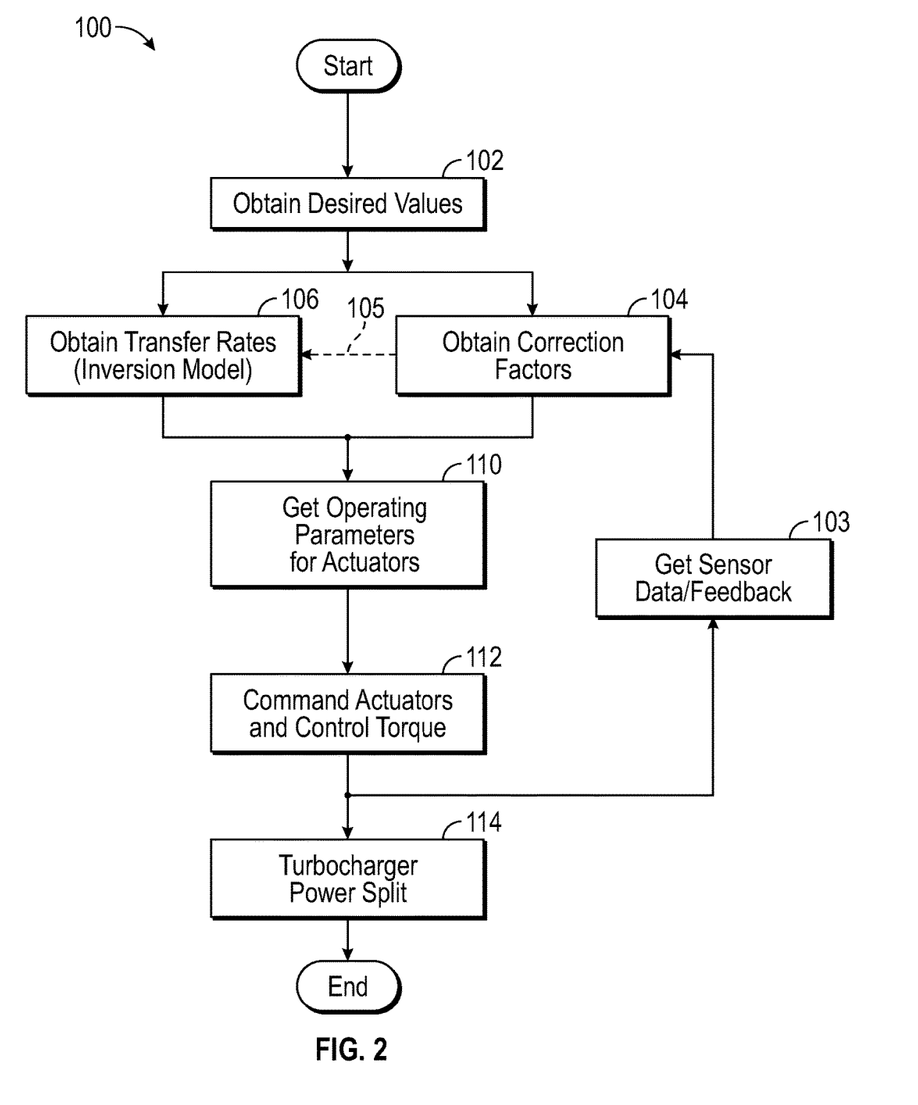
FIG. 2 is a flowchart for a method executable by the controller of FIG. 1.
Figure 3:
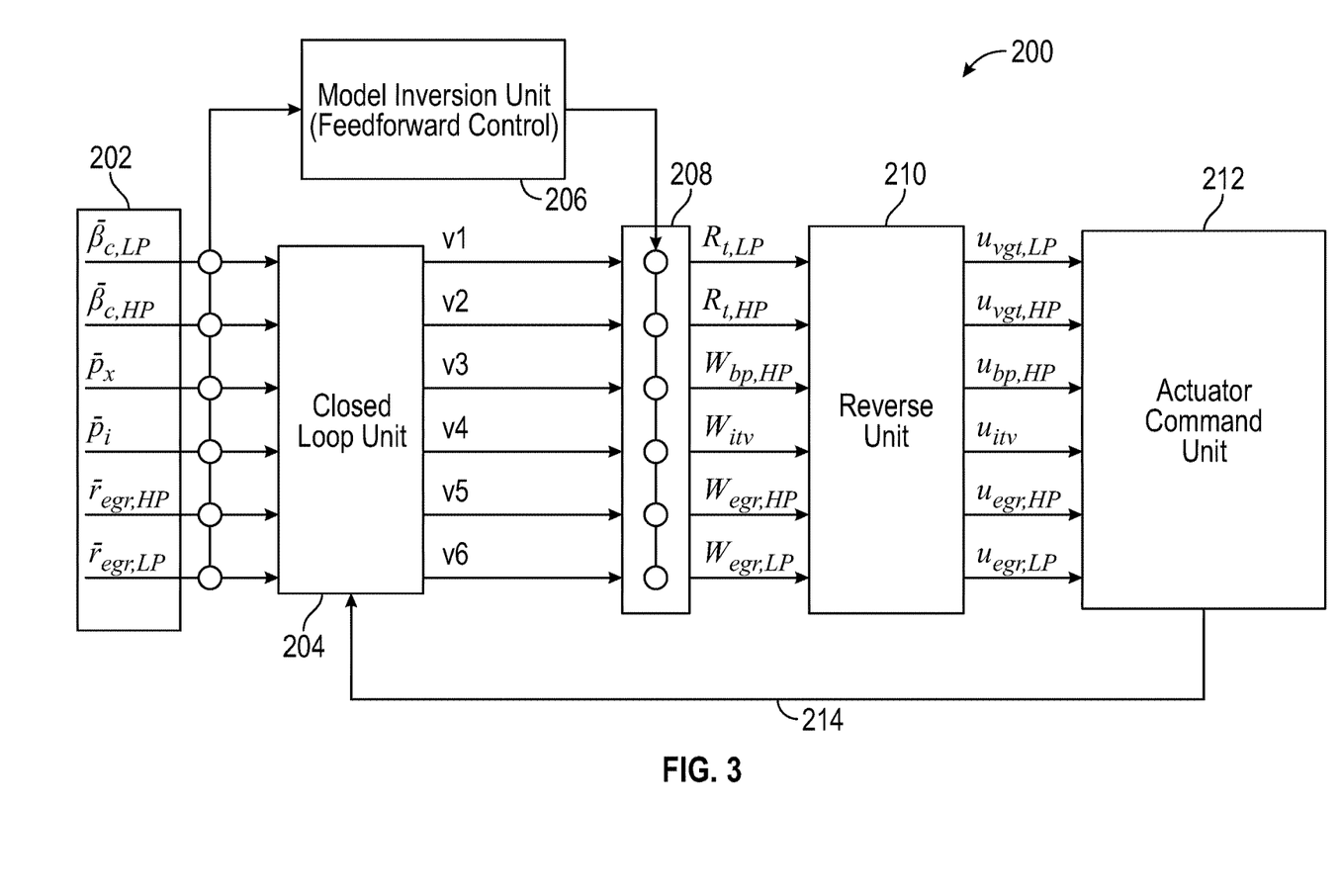
FIG. 3 is a diagram of a control structure embodying the method of FIG. 2, in accordance with a first embodiment.
Figure 4:
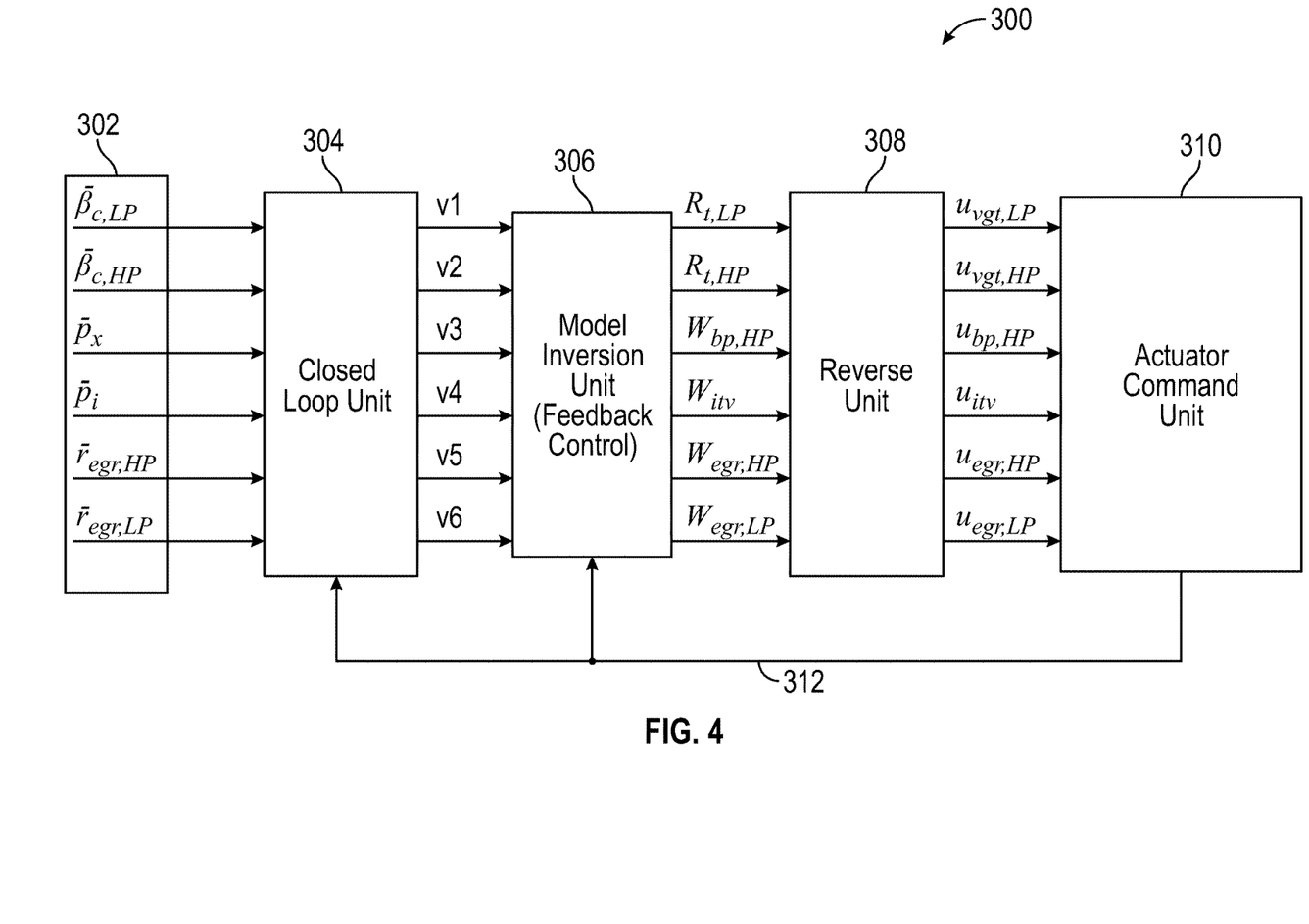
FIG. 4 is a diagram of another control structure embodying the method of FIG. 2, in accordance with a second embodiment.

Referring now to FIG. 2, a flowchart of the method 100 stored on and executable by the controller C of FIG. 1 is shown. The controller C of FIG. 1 is specifically programmed to execute the steps of the method 100. The method 100 need not be applied in the specific order recited herein. Furthermore, it is to be understood that some steps may be eliminated. A first control structure 200 embodying the method 100, in accordance with a first embodiment, is shown in FIG. 3. A second control structure 300 embodying the method 100, in accordance with a second embodiment, is shown in FIG. 4. In the first embodiment, the first control structure 200 employs feed forward linearization. In the second embodiment, the second control structure 300 employs feedback linearization.

Referring to FIG. 2, method 100 may begin with block 102, where the controller C is programmed or configured to determine a respective plurality of desired values for the plurality of actuators 39, based at least partially on the torque request. Referring to FIGS. 3-4, the first and second control structures 200, 300 include a set-point unit 202, 302, respectively, for determining the respective plurality of desired values (block 102 of FIG. 2). Referring to FIGS. 3-4, the respective plurality of desired values may include: a desired low pressure compressor pressure ratio ($\bar{\beta}_{c,LP}$), a desired high pressure compressor pressure ratio ($\bar{\beta}_{c,HP}$), a desired exhaust pressure ($\bar{p}_x$), a desired intake pressure ($\bar{p}_i$), a desired high pressure exhaust gas recirculation rate ($\bar{r}_{egr,HP}$), and a desired low pressure exhaust gas recirculation rate ($\bar{r}_{egr,LP}$). Alternatively, the desired high pressure exhaust gas recirculation rate ($\bar{r}_{egr,HP}$), and a desired low pressure exhaust gas recirculation rate ($\bar{r}_{egr,LP}$) may be replaced by a desired burned gas fraction in an intake manifold ($\bar{F}_i$), and a desired burned gas fraction in a low pressure compressor inlet 32 ($\bar{F}_c$). These desired values are set for the system outputs described by the air charging system equations below:

$$\dot{p}_x = \frac{RT_x}{V_x}(W_{cyl} + W_f - W_{egr,HP}) - \frac{RT_x}{V_x}W_{t,HP} - \frac{RT_x}{V_x}W_{bp,HP}(u_{bp}^{HP})$$

$$\dot{\beta}_C^{HP} = -c_1 P_{c,HP} + c_1 h_{t,HP} \cdot R_{t,HP}\left(\frac{W_{t,HP}\sqrt{T_x}}{p_{x1}}, u_{VGT}^{HP}\right)$$

$$\dot{\beta}_C^{LP} = -cP_{c,LP} + ch_{t,LP}R_{t,LP}\left(\frac{W_x\sqrt{T_{x1}}}{p_{x0}}, u_{VGT}^{LP}\right)$$

$$\begin{bmatrix} \frac{V_i}{RT_i}\dot{p}_i \\ \frac{m_i}{\lambda}\dot{r}_{egr,HP} \\ \frac{m_i}{\lambda}\dot{r}_{egr,LP} \end{bmatrix} = \begin{bmatrix} -W_{cyl} \\ 0 \\ 0 \end{bmatrix} + \begin{bmatrix} 1 & 1 & 0 \\ F_c - F_i & F_x - F_i & 0 \\ -F_c & 0 & F_x(t-\tau) \end{bmatrix} \begin{bmatrix} W_{itv} \\ W_{egr,HP} \\ W_{egr,LP} \end{bmatrix}$$

$$\dot{p}_x = \frac{RT_x}{V_x}(W_{cyl} + W_f - W_{egr,HP}) - \frac{RT_x}{V_x}W_{t,HP} - \frac{RT_x}{V_x}W_{bp,HP}(u_{bp}^{HP})$$

-continued $$\dot{\beta}_C^{HP} = -c_1 P_{c,HP} + c_1 h_{t,HP} \cdot R_{t,HP}\left(\frac{W_{t,HP}\sqrt{T_x}}{p_{x1}}, u_{vgt}^{HP}\right)$$

$$\dot{\beta}_C^{LP} = -cP_{c,LP} + ch_{t,LP}R_{t,LP}\left(\frac{W_x\sqrt{T_{x1}}}{p_{xo}}, u_{vgt}^{LP}\right)$$

$$\begin{bmatrix} \frac{V_i}{RT_i}\dot{p}_i \\ m_i\dot{F}_i \\ m_c\dot{F}_c \end{bmatrix} = \begin{bmatrix} -W_{cyl} \\ 0 \\ 0 \end{bmatrix} + \begin{bmatrix} 1 & 1 & 0 \\ F_c - F_i & F_x - F_i & 0 \\ -F_c & 0 & F_x(t-\tau) \end{bmatrix} \begin{bmatrix} W_{itv} \\ W_{egr,HP} \\ W_{egr,LP} \end{bmatrix}$$

On the leftside of these equations, $\dot{x}$ denotes the derivative of a variable x. For example, $\dot{p}_i$ represents the derivative of $p_i$. In these equations, $V_i$ is the intake manifold volume, $V_x$ the exhaust manifold volume, R the gas constant, $m_i$ the intake manifold mass, $\lambda$ the stoichiometric air-fuel ratio, $c_1$ and c are constants that can be calibrated. The remaining parameters are defined below.

In block 104 of FIG. 2, the controller C is programmed to obtain respective correction factors for the respective plurality of desired values, for example, via a closed loop unit ("CLU" in FIG. 1) in the controller C. Per block 103, the controller C is programmed to receive sensor feedback (from one or more of the sensors 68 operatively connected to the controller C). Referring to FIGS. 3-4, the first and second control structures 200, 300 include a closed loop unit 204, 304, respectively, for determining the respective correction factors (block 104 of FIG. 2). In the embodiment shown in FIGS. 3-4, there are six correction factors ($v_1$, $v_2$, $v_3$, $v_4$, $v_5$, $v_6$), however it is to be understood that the number may be varied per the application at hand. The closed loop units 204, 304 may be proportional-integral-derivative (PID) units, a model predictive control units (MPC) or other closed loop units available to those skilled in the art.

In block 106 of FIG. 2, the controller C is programmed to obtain respective transfer rates for the plurality of actuators 39. The controller C may include a model inversion (or inversion model) unit ("IM" in FIG. 1) to execute block 106. The respective transfer rates may include: a low pressure turbine transfer rate ($R_{t,LP}$), a high pressure turbine transfer rate ($R_{t,HP}$), a high pressure bypass flow ($W_{bp,HP}$), an intake throttle valve flow ($W_{itv}$), a high pressure exhaust gas recirculation flow ($W_{egr,HP}$), and a low pressure exhaust gas recirculation flow ($W_{egr,LP}$) (see FIGS. 3-4). Referring to FIG. 3, the first control structure 200 includes a model inversion unit 206 and summation unit 208 to determine the respective transfer rates (block 106 of FIG. 2). Referring to FIG. 3, the summation unit 208 is configured to sum an output of the model inversion unit 206 and an output of the closed loop unit 204 in order to obtain the respective transfer rates.

Referring to FIG. 4, the second control structure 300 includes a model inversion unit 306 to determine the respective transfer rates (block 106). Referring to FIG. 2, the respective correction factors obtained in block 104 may be inputted into block 106, as indicated by line 105; this is depicted in the control structure 300 of FIG. 4 (second embodiment).

Referring to FIG. 3 for calculating feedforward control, the low pressure turbine transfer rate ($R_{t,LP}$) may be obtained as a function of a low pressure turbine enthalpy ($h_{t,LP}$), a desired low pressure compressive power ($P_{c,LP}$) calculated based on the desired $\bar{\beta}_{c,LP}$, and one of the respective correction factors ($v_1$) such that:

$$R_{t,LP} = \frac{P_{c,LP}}{h_{t,LP}} + v_1.$$

Referring to FIG. 4 for calculating feedback linearization, ($P_{c,LP}$) is calculated based on the direct measurement of $\bar{\beta}_{c,LP}$ from the corresponding sensors.

The high pressure turbine transfer rate ($R_{t,HP}$) may be obtained as a function of a high pressure compressive power ($P_{c,HP}$), a desired charge flow into the high pressure turbine ($\overline{W}_{t,HP,des}$), an exhaust temperature ($T_x$), the specific heat capacity ($c_p$) and one of the respective correction factors ($v_2$) such that:

$$R_{t,HP} = \frac{P_{c,HP}}{c_p \overline{W}_{t,HP,des} T_x} + v_2.$$

Again, the high pressure compressive power ($P_{c,HP}$) may be calculated either based on the desired $\bar{\beta}_{c,HP}$, or the measured $\beta_{c,HP}$.

The high pressure bypass flow ($W_{bp,HP}$) may be based at last partially on a total charge flow into the engine ($W_{cyl}$), a total fuel flow injected ($W_f$), a high pressure exhaust gas recirculation flow ($W_{egr,HP}$), a desired charge flow into the high pressure turbine ($\overline{W}_{t,HP,des}$) and one of the respective correction factors ($v_3$) such that:

$$W_{bp,HP} = (W_{cyl} + W_f - W_{egr,HP}) - \overline{W}_{t,HP,des} + v_3.$$

The intake throttle valve flow ($W_{itv}$), the high pressure EGR flow ($W_{egr,HP}$) and the low pressure EGR flow ($W_{egr,LP}$) may be at least based partially on the total charge flow into the engine ($W_{cyl}$), a compressor inlet burnt gas fraction ($F_c$), an intake manifold burnt gas fraction ($F_i$), an exhaust manifold burnt gas fraction ($F_x$), a time (t), a time delay ($\tau$), and some of the respective correction factors ($v_4$, $v_5$, $v_6$) such that:

$$\begin{bmatrix} W_{itv} \\ W_{egr,HP} \\ W_{egr,LP} \end{bmatrix} = \begin{bmatrix} 1 & 1 & 0 \\ F_c - F_i & F_x - F_i & 0 \\ -F_c & 0 & F_x(t-\tau) \end{bmatrix}^{-1} \begin{bmatrix} W_{cyl} \\ 0 \\ 0 \end{bmatrix} + \begin{bmatrix} v_4 \\ v_5 \\ v_6 \end{bmatrix}.$$

In block 110 of FIG. 2, the controller C is programmed to obtain respective operating parameters for the plurality of actuators 39 based at least partially on the respective transfer rates. Referring to FIGS. 3-4, the respective operating parameters may include: a low pressure turbine position ($u_{vgt,LP}$), a high pressure turbine position ($u_{vgt,HP}$), a high pressure bypass valve position ($u_{bp,HP}$), an intake throttle valve position ($u_{itv}$), a high pressure exhaust gas recirculation valve position ($u_{egr,HP}$), and a low pressure exhaust gas recirculation valve position ($u_{egr,LP}$). Referring to FIGS. 3-4, the first and second control structures 200, 300 include a reverse unit 210, 308, respectively, for determining the respective operating parameters (block 110 of FIG. 2). It is to be understood that reverse modules available to those skilled in the art may be employed. In one example, the low pressure turbine position ($u_{vgt,LP}$), the high pressure turbine position ($u_{vgt,HP}$) and the bypass valve position ($u_{bp,LP}$) may be determined based on the following expressions:

$$u_{vgt}^{HP} = f\left(\frac{\overline{W}_{t,HP}\sqrt{T_x}}{p_{x1}}, \frac{P_c^{HP}}{\sqrt{T_x}\, p_{x1}}\right), \text{ or}$$

$$u_{vgt}^{HP} = f\left(\frac{\overline{W}_{t,HP}\sqrt{T_x}}{p_{x1}}, \frac{P_c^{HP}}{\overline{W}_{t,HP} c_p T_x}\right),$$

$$u_{bp}^{HP} = f\left(\frac{\overline{W}_{bp,HP}\sqrt{T_x}}{p_{x1}}, \bar{\beta}_t^{HP}\right)$$

Here, $p_{x1}$ is an exhaust pressure in between the first and the second turbines 30, 34 and $P_c^{HP}$ is a low pressure compressive power.

In block 112 of FIG. 2, the controller C is programmed to control a torque output of the engine 14 by commanding the plurality of actuators 39 to the respective operating parameters (obtained in block 110) via their respective command signals. Referring to FIGS. 3-4, the first and second control structures 200, 300 include an actuator command unit 212, 310, respectively, for commanding the plurality of actuators 39 to the respective operating parameters (block 112 of FIG. 2). As indicated by line 214 in FIG. 3, the respective operating parameters from the actuator command unit 212 are provided to the closed loop unit 204. As indicated by line 312 in FIG. 4, the respective operating parameters from the actuator command unit 310 are provided to the model inversion unit 306 and the closed loop unit 304.

While the assembly 12 as described above increases boosting capability, further improvements in fuel economy may be obtained through maximizing compressor efficiency and minimizing engine pumping loss. In block 114 of FIG. 2, the controller C may be programmed to apply a turbocharger power split determination, as described below. The total turbo boosting efficiency of the assembly 12 may be defined as the ratio of a high pressure compressor outlet temperature ($T_{out}$) and a low pressure compressor inlet temperature ($T_{in}$).

$$Q_{c1} = \frac{W_c \sqrt{T_{in}}}{p_{in}}$$

$$\frac{T_{out}}{T_{in}} = \frac{T_{out}}{T_1} \cdot \frac{T_1}{T_{in}}$$

$$= \left[1 + R_{C2}\left(\frac{\beta_c}{\beta_{c,LP}}, Q_{c1} \frac{\sqrt{1 + R_{C1}(\beta_{c,LP}, Q_{c1})}}{\beta_{c,LP}}\right)\right]$$

$$(1 + R_{C1}(\beta_{c,LP}, Q_{c1}))$$

Here $\bar{\beta}_c$ is the desired boost pressure, $\bar{\beta}_{c,LP}$ is the low pressure compressor ratio, and $Q_{c1}$ and $Q_{c2}$ denote the corrected flow through the first and second compressors 28, 32, respectively. Additionally, functions $R_{C1}$ and $R_{C2}$ denote the transfer rates through the first and second compressors 28, 32, respectively. The power split ratio (PSR) may be based on the desired boost pressure ($\bar{\beta}_c$), desired low pressure compressor ratio ($\bar{B}_{c,LP}$) such that:

$$PSR = \frac{\bar{\beta}_{c,LP} - 1}{\bar{\beta}_c - 1}$$

In order to maximize compressor efficiency, the controller C may be further programmed to minimize the total turbo boosting efficiency as follows:

$$\min_{\beta_C^{LP}} \frac{T_{out}}{T_{in}} \left( \frac{W_C \sqrt{T_{in}}}{p_{in}}, \beta_{c,LP}, \bar{\beta}_c \right)$$

The minimization results generate an optimal split for the low pressure compressor pressure ratio that becomes a function of $\bar{\beta}_c$ and $Q_{c1}$ as follows:

$$\bar{\beta}_{c,LP'} = \left( \frac{W_C \sqrt{T_{in}}}{p_{in}}, \bar{\beta}_c \right)$$

Once the boost pressure split is determined, the intermediate pressure between the first and second turbines 30, 34 can be determined as a function of split compressor pressure. In the expressions below, $P_x$ is the engine exhaust pressure, $p_{x1}$ is the exhaust pressure in-between the first and second turbines 30, 34, and $p_{x0}$ is the exhaust pressure after the second turbine 34. Additionally, $T_x$ is the exhaust temperature, $T_{x1}$ is the exhaust temperature in between first and second turbines 30, 34 turbines, $T_{x0}$ is the exhaust temperature after second turbine 34 and $c_p$ is the heat capacity. The engine pumping loss or exhaust pressure may be minimized as:

$$T_{x1} = T_{x0} + R_{c1} \cdot T_{in}$$

$$\min_{W_t^{HP}} \frac{p_x}{p_{x0}} =$$

$$\frac{p_x}{p_{x1}} \frac{p_{x1}}{p_{x0}} = f\left( \frac{P_c^{HP}}{\sqrt{T_x} \, p_{x1}}, \frac{W_t^{HP} \sqrt{T_x}}{p_{x1}} \right) \cdot g\left( \frac{P_c^{LP}}{W_x c_p T_{x1}}, \frac{W_x \sqrt{T_{x1}}}{p_{x0}} \right)$$

$$p_{x1} = g\left( \frac{P_c^{LP}}{W_x c_p T_{x1}}, \frac{W_x \sqrt{T_{x1}}}{p_{x0}} \right) p_{x0}$$

Since the exhaust pressure in-between the first and second turbines 30, 34 ($p_{x1}$) is known, it is equivalent to minimize one of the following:

$$\min_{W_t^{HP}} p_x = f\left( \frac{P_c^{HP}}{\sqrt{T_x} \, p_{x1}}, \frac{W_t^{HP} \sqrt{T_x}}{p_{x1}} \right) p_{x1} \text{ or}$$

$$\min_{W_t^{HP}} p_x = \min_{W_t^{HP}} f\left( \frac{P_c^{HP}}{W_t^{HP} c_p T_x}, \frac{W_t^{HP} \sqrt{T_x}}{p_{x1}} \right) p_{x1} =$$

$$\min_{\substack{W_{by\text{-}pass}^{HP}}} f\left( \frac{P_c^{HP}}{(W_x - W_{by\text{-}pass}^{HP}) c_p T_x}, \frac{(W_x - W_{by\text{-}pass}^{HP}) \sqrt{T_x}}{p_{x1}} \right) p_{x1}$$

In summary, the method 100 includes a model-based multi-input multi-output (MIMO) approach. The set point optimization enables the maximization of engine breathing and minimization of pumping loss. The method 100 provides an effective and efficient way to deal with a complex system, maximize boosting capability, reduce fuel consumption, and reduce calibration efforts to optimize and control the assembly 12.

The controller C of FIG. 1 may be an integral portion of, or a separate module operatively connected to, other controllers of the device 10, such as the engine controller. The controller C includes a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of controlling air charging of an engine assembly having an engine configured to produce an exhaust gas discharged through an exhaust gas conduit, an intake throttle valve configured to adjust air delivered to the engine and positioned in an air inlet conduit, an exhaust gas recirculation (EGR) system, a two-stage turbocharger system, and a controller having a processor and a tangible, non-transitory memory on which is recorded instructions for executing a method, the two-stage turbocharger system including a high pressure turbine operatively connected to the engine, a low pressure turbine serially connected to the high pressure a second turbine, a high pressure turbine bypass valve configured to control the air to the high pressure turbine, a high pressure compressor configured to be driven by the high pressure turbine, and a low pressure compressor configured to be driven by the low pressure turbine, the exhaust gas recirculation (EGR) system including a high pressure exhaust gas recirculation valve located in a first conduit between the air inlet conduit and the exhaust gas conduit, and a low pressure exhaust gas recirculation valve located in a second conduit between the air inlet conduit and the exhaust gas conduit, the method comprising:

determining a respective plurality of desired values for the at least one of the intake throttle valve, the EGR system and the two-stage turbocharger system, and obtaining a sensor feedback from the sensor, via the controller;

obtaining respective correction factors for the at least one of the intake throttle valve, the EGR system and the two-stage turbocharger system based at least partially on the respective plurality of desired values and the sensor feedback;

obtaining respective transfer rates for the at least one of the intake throttle valve, the EGR system and the two-stage turbocharger system based at least partially on the respective correction factors, via the controller, the respective transfer rates including a low pressure turbine transfer rate ($R_{t,LP}$);

obtaining the low pressure turbine transfer rate ($R_{t,LP}$) as a function of a low pressure turbine enthalpy ($h_{t,LP}$), a low pressure compressive power ($P_{c,LP}$), and one of the respective correction factors ($v_1$) such that:

$$R_{t,LP} = \frac{P_{c,LP}}{h_{t,LP}} + v_1;$$

obtaining respective operating parameters for the at least one of the intake throttle valve, the EGR system and the two-stage turbocharger system based at least partially on the respective transfer rates, via the controller; and controlling an output of the engine by commanding the at least one of the intake throttle valve, the EGR system and the two-stage turbocharger system to the respective operating parameters via respective command signals from the controller.

2. The method of claim 1, wherein the respective transfer rates include a high pressure turbine transfer rate ($R_{t,HP}$), the method further comprising:

obtaining the high pressure turbine transfer rate ($R_{t,HP}$) as a function of a high pressure compressive power ($P_{c,HP}$), a desired charge flow into the high pressure turbine ($\overline{W}_{t,HP,des}$), an exhaust temperature ($T_x$), a predefined capacity ($c_p$) and another one of the respective correction factors ($v_2$) such that:

$$R_{t,HP} = \frac{P_{c,HP}}{c_p \overline{W}_{t,HP,des} T_x} + v_2.$$

3. The method of claim 1, wherein the respective transfer rates include a intake throttle valve flow ($W_{itv}$), a high pressure EGR flow ($W_{egr,HP}$) and a low pressure EGR flow ($W_{egr,LP}$), the method further comprising:

obtaining the intake throttle valve flow ($W_{itv}$), the high pressure EGR flow ($W_{egr,HP}$) and the low pressure EGR flow ($W_{egr,LP}$) based at least partially on the total charge flow into the engine ($W_{cyl}$), a compressor inlet burnt gas fraction ($F_c$), an intake manifold burnt gas fraction ($F_i$), an exhaust manifold burnt gas fraction ($F_x$), a time (t), a time delay ($\tau$), and other ones of the respective correction factors ($v_4, v_5, v_6$) such that:

$$\begin{bmatrix} W_{itv} \\ W_{egr,HP} \\ W_{egr,LP} \end{bmatrix} = \begin{bmatrix} 1 & 1 & 0 \\ F_c - F_i & F_x - F_i & 0 \\ -F_c & 0 & F_x(t-\tau) \end{bmatrix}^{-1} \begin{bmatrix} W_{cyl} \\ 0 \\ 0 \end{bmatrix} + \begin{bmatrix} v_4 \\ v_5 \\ v_6 \end{bmatrix}.$$

4. The method of claim 1, wherein the respective transfer rates include a high pressure bypass flow ($W_{bp,HP}$), the method further comprising:

obtaining the high pressure bypass flow ($W_{bp,HP}$) based at last partially on a total charge flow into the engine ($W_{cyl}$), a total fuel flow injected ($W_f$), a high pressure exhaust gas recirculation flow ($W_{egr,HP}$), a desired charge flow into the high pressure turbine ($\overline{W}_{t,HP,des}$) and another one of the respective correction factors ($v_3$) such that:

$$W_{bp,HP} = (W_{cyl} + W_f - W_{egr,HP}) - \overline{W}_{t,HP,des} + v_3.$$

5. An engine assembly comprising:

an engine configured to produce an exhaust gas discharged through an exhaust gas conduit;

an intake throttle valve configured to adjust air delivered to the engine, the intake throttle valve being positioned in an air inlet conduit;

an exhaust gas recirculation (EGR) system including: a high pressure exhaust gas recirculation valve located in a first conduit between the air inlet conduit and the exhaust gas conduit, and a low pressure exhaust gas recirculation valve located in a second conduit between the air inlet conduit and the exhaust gas conduit;

a two-stage turbocharger system including: a high pressure turbine operatively connected to the engine, a low pressure turbine serially connected to the high pressure turbine, a high pressure turbine bypass valve configured to control the air to the high pressure turbine, a high pressure compressor configured to be driven by the high pressure turbine, and a low pressure compressor configured to be driven by the low pressure turbine;

a controller configured to transmit respective command signals to at least one of the intake throttle valve, the EGR system and the two-stage turbocharger system;

at least one sensor configured to transmit a sensor feedback to the controller;

wherein the controller has a processor and a tangible, non-transitory memory on which is recorded executable instructions to:

determine a respective plurality of desired values for the at least one of the intake throttle valve, the EGR system and the two-stage turbocharger system;

obtain respective correction factors for the at least one of the intake throttle valve, the EGR system and the two-stage turbocharger system based at least partially on the respective plurality of desired values and the sensor feedback;

obtain respective transfer rates for the at least one of the intake throttle valve, the EGR system and the two-stage turbocharger system based at least partially on the respective correction factors, the respective transfer rates include a high pressure turbine transfer rate ($R_{t,HP}$);

obtain the high pressure turbine transfer rate ($R_{t,HP}$) as a function of a high pressure compressive power ($P_{c,HP}$), a desired charge flow into the high pressure turbine ($\overline{W}_{t,HP,des}$), an exhaust temperature ($T_x$), a predefined capacity ($c_p$) and one of the respective correction factors ($v_2$) such that:

$$R_{t,HP} = \frac{P_{c,HP}}{c_p \overline{W}_{t,HP,des} T_x} + v_2;$$

and
control an output of the engine by commanding the at least one of the intake throttle valve, the EGR system and the two-stage turbocharger system to the respective operating parameters via the respective command signals.

6. The engine assembly of claim 5, wherein:
the respective transfer rates include a high pressure bypass flow ($W_{bp,HP}$); and
the high pressure bypass flow ($W_{bp,HP}$) is based at last partially on a total charge flow into the engine ($W_{cyl}$), a total fuel flow injected ($W_f$), a high pressure exhaust gas recirculation flow ($W_{egr,HP}$), a desired charge flow into the high pressure turbine ($\overline{W}_{t,HP,des}$) and another one of the respective correction factors ($v_3$) such that:

$$W_{bp,HP} = (W_{cyl} + W_f - W_{egr,HP}) - \overline{W}_{t,HP,des} + v_3.$$

7. The engine assembly of claim 5, wherein:
the respective transfer rates include an intake throttle valve flow ($W_{itv}$), a high pressure exhaust gas recirculation flow ($W_{egr,HP}$) and a low pressure exhaust gas recirculation flow ($W_{egr,LP}$); and
the intake throttle valve flow ($W_{itv}$), the high pressure EGR flow ($W_{egr,HP}$) and the low pressure EGR flow ($W_{egr,LP}$) are based at least partially on the total charge flow into the engine ($W_{cyl}$), a compressor inlet burnt gas fraction ($F_c$), an intake manifold burnt gas fraction ($F_i$), an exhaust manifold burnt gas fraction ($F_x$), a time ($t$), a time delay ($\tau$), and other ones of the respective correction factors ($v_4, v_5, v_6$) such that:

$$\begin{bmatrix} W_{itv} \\ W_{egr,HP} \\ W_{egr,LP} \end{bmatrix} = \begin{bmatrix} 1 & 1 & 0 \\ F_c - F_i & F_x - F_i & 0 \\ -F_c & 0 & F_x(t-\tau) \end{bmatrix}^{-1} \begin{bmatrix} W_{cyl} \\ 0 \\ 0 \end{bmatrix} + \begin{bmatrix} v_4 \\ v_5 \\ v_6 \end{bmatrix}.$$

8. An engine assembly comprising:
an engine configured to produce an exhaust gas discharged through an exhaust gas conduit;
an intake throttle valve configured to adjust air delivered to the engine, the intake throttle valve being positioned in an air inlet conduit;
an exhaust gas recirculation (EGR) system including a high pressure exhaust gas recirculation valve located in a first conduit between the air inlet conduit and the exhaust gas conduit, and a low pressure exhaust gas recirculation valve located in a second conduit between the air inlet conduit and the exhaust gas conduit;
a two-stage turbocharger system including a high pressure turbine operatively connected to the engine, a low pressure turbine serially connected to the high pressure turbine, a high pressure turbine bypass valve configured to control the air to the high pressure turbine, a high pressure compressor configured to be driven by the high pressure turbine, and a low pressure compressor configured to be driven by the low pressure turbine;
a controller configured to transmit respective command signals to at least one of the intake throttle valve, the EGR system and the two-stage turbocharger system;
at least one sensor configured to transmit a sensor feedback to the controller;
wherein the controller has a processor and a tangible, non-transitory memory on which is recorded executable instructions to:
determine a respective plurality of desired values for the at least one of the intake throttle valve, the EGR system and the two-stage turbocharger system;
obtain respective correction factors for the at least one of the intake throttle valve, the EGR system and the two-stage turbocharger system based at least partially on the respective plurality of desired values and the sensor feedback;
obtain respective transfer rates for the at least one of the intake throttle valve, the EGR system and the two-stage turbocharger system based at least partially on the respective correction factors, the respective transfer rates including a low pressure turbine transfer rate ($R_{t,LP}$);
obtain the low pressure turbine transfer rate ($R_{t,LP}$) as a function of a low pressure turbine enthalpy ($h_{t,LP}$), a low pressure compressive power ($P_{c,LP}$), and one of the respective correction factors ($v_1$) such that:

$$R_{t,LP} = \frac{P_{c,LP}}{h_{t,LP}} + v_1;$$

obtain respective operating parameters for the at least one of the intake throttle valve, the EGR system and the two-stage turbocharger system based at least partially on the respective transfer rates; and
control an output of the engine by commanding the at least one of the intake throttle valve, the EGR system and the two-stage turbocharger system to the respective operating parameters via the respective command signals.

9. The engine assembly of claim 8, wherein the respective plurality of desired values include:
a desired low pressure compressor pressure ratio ($\overline{\beta}_{c,LP}$);
a desired high pressure compressor pressure ratio ($\overline{\beta}_{c,HP}$);
a desired exhaust pressure ($\overline{p}_x$);
a desired intake pressure ($\overline{p}_i$);
at least one of a desired high pressure exhaust gas recirculation rate ($\overline{r}_{egr,HP}$) and a desired burned gas fraction in an intake manifold ($\overline{F}_i$); and
at least one of a desired low pressure exhaust gas recirculation rate ($\overline{r}_{egr,LP}$) and a desired burned gas fraction in a low pressure compressor inlet ($\overline{F}_c$).

10. The engine assembly of claim 8, wherein:
the controller further includes executable instructions to determine a power split ratio (PSR) based on a desired boost pressure ($\overline{\beta}_c$) and a desired low pressure compressor ratio ($\overline{\beta}_{c,LP}$) such that:

$$PSR = \frac{\overline{\beta}_{c,LP} - 1}{\overline{\beta}_c - 1}.$$

11. The engine assembly of claim 8, wherein the respective operating parameters include:
a low pressure turbine position ($u_{vgt,LP}$);
a high pressure turbine position ($u_{vgt,HP}$);
a high pressure bypass valve position ($u_{vgt,HP}$);
an intake throttle valve position ($u_{itv}$);
a high pressure exhaust gas recirculation valve position ($u_{egr,HP}$); and
a low pressure exhaust gas recirculation valve position ($u_{egr,LP}$).

12. The engine assembly of claim 8, wherein:
the respective transfer rates include a high pressure turbine transfer rate ($R_{t,HP}$); and
the high pressure turbine transfer rate ($R_{t,HP}$) is obtained as a function of a high pressure compressive power ($P_{c,HP}$), a desired charge flow into the high pressure turbine ($\overline{W}_{t,HP,des}$), an exhaust temperature ($T_x$), a predefined capacity ($c_p$) and another one of the respective correction factors ($v_2$) such that:

$$R_{t,HP} = \frac{P_{c,HP}}{c_p \overline{W}_{t,HP,des} T_x} + v_2.$$

13. The engine assembly of claim 8, wherein:
the respective transfer rates include a high pressure bypass flow ($W_{bp,HP}$); and
the high pressure bypass flow ($W_{bp,HP}$) is based at last partially on a total charge flow into the engine ($W_{cyl}$), a total fuel flow injected ($W_f$), a high pressure exhaust gas recirculation flow ($W_{egr,HP}$), a desired charge flow into the high pressure turbine ($\overline{W}_{t,HP,des}$) and another one of the respective correction factors ($v_3$) such that:

$$W_{bp,HP} = (W_{cyl} + W_f - W_{egr,HP}) - W_{t,HP,des} + v_3.$$

14. The engine assembly of claim 8, wherein:
the respective transfer rates include an intake throttle valve flow ($W_{itv}$), a high pressure exhaust gas recirculation flow ($W_{egr,HP}$) and a low pressure exhaust gas recirculation flow ($W_{egr,LP}$); and
the intake throttle valve flow ($W_{itv}$), the high pressure EGR flow ($W_{egr,HP}$) and the low pressure EGR flow ($W_{egr,LP}$) are based at least partially on the total charge flow into the engine ($W_{cyl}$), a compressor inlet burnt gas fraction ($F_c$), an intake manifold burnt gas fraction ($F_i$), an exhaust manifold burnt gas fraction ($F_x$), a time ($t$), a time delay ($\tau$), and other ones of the respective correction factors ($v_4$, $v_5$, $v_6$) such that:

$$\begin{bmatrix} W_{itv} \\ W_{egr,HP} \\ W_{egr,LP} \end{bmatrix} = \begin{bmatrix} 1 & 1 & 0 \\ F_c - F_i & F_x - F_i & 0 \\ -F_c & 0 & F_x(t-\tau) \end{bmatrix}^{-1} \begin{bmatrix} W_{cyl} \\ 0 \\ 0 \end{bmatrix} + \begin{bmatrix} v_4 \\ v_5 \\ v_6 \end{bmatrix}.$$

\* \* \* \* \*